Patented Jan. 1, 1929.

1,697,263

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF OXIDIZING KEROSENE.

No Drawing.  Application filed December 27, 1921. Serial No. 525,155.

This invention relates to a method of producing various products of oxidation of hydrocarbons including unsaturated bodies of the nature of olefins and the like, and is a continuation in part of my copending application Serial No. 284,372, filed March 22, 1919.

The invention is particularly concerned with the oxidation of petroleum oil such as kerosene and heavier oils by means of air or an oxygen-containing gas in the presence of a catalyzer, all as will be more fully hereinafter described, and the object of the invention is to produce various oxidized products such as aldehydes, ketones, acids and the like, which, being made from cheap materials, may have an extensive use in various industries.

In one form of the present invention heavy petroleum oil may be dropped into a heated pan or retort and allowed to vaporize or gasify. The gases and vapors may be passed through a heated tube or retort to produce cracked hydrocarbons containing unsaturated bodies. The heavier constituents may be removed if desired. The lighter constituents and gases may be washed to remove sulphur compounds or any other undesirable constituents. Such vapors and gases are mixed with air and introduced into a catalytic chamber where the mixture is brought into contact with a catalyzer such as a spiral of copper gauze, brass, iron or other suitable catalytic material in the form of metal as for example pieces of wire gauze or fragments. The evolution of heat due to the oxidation is such that an all metal catalyzer or one the basis of which is metal but which may have a coating of oxide, etc., is especially well suited for carrying out the process. Large masses of catalyzer of a non-conducting character are liable to overheat and temperatures represented by a red heat or higher are generally speaking objectionable leading to the formation of tars and useless products of decomposition. The use of a catalyzer having substantially the conductivity of metal therefore forms one phase of the present invention. Other catalyzers may be used such as copper or chromium oxide and compounds of two active oxidizing agents such as iron vanadate, silver chromate and the like. Whether or not these duplex catalyzers remain as compounds during operation or whether they break down into mixtures of oxides etc. is not definitely known and in fact probably considerable variations in the composition exist under different conditions. However such a duplex catalyst as for example iron and vanadium or silver and chromium are used advantageously. It may be that one metal has a stimulating action on the other serving as a promoter. Catalyzer of this character may be supported on any suitable carrier if desired. Thus fragments of pumice or a metallic carrier may be used. For example masses of spongy iron may be impregnated with ammonium vanadate and heated to form a composite or duplex catalyzer.

For example a mixture of oil gas may be mixed with air and passed over a spiral of copper gauze which is maintained at a temperature just below a low red heat. The copper serves to conduct heat away from the interior of the mass and thus aids in the very important factor of temperature control. As stated a temperature just below a low red heat is employed. A black heat approaching incipient redness, that is temperatures between 400 and 500° C. are those employed. In some cases it is desirable to have the temperature below 400° C. especially when endeavoring to oxidize to products which are very heat-sensitive. On the other hand temperatures much above 500° C. as for example low red heat and bright red heat lead to uncontrollable reactions, formation of tars and danger of clogging the catalyst; unless the amount of oxygen present is large in proportion in which case the combustion is likely to go completely to carbon dioxide or a mixture of carbon monoxide and the dioxide.

In order to further favor the control of temperature the catalytic chamber may be arranged to regenerate the heat, that is to say the incoming air and vapors may be passed about the catalytic chamber in such a manner as to cool the latter so that an excessive temperature is not developed which would destroy the products of selective oxidation.

The reaction also may be controlled to some extent by the addition of steam or an inert gas to dilute the mixture entering the catalytic chamber.

In oxidizing vapors or gases of this character the control of the temperature within narrow limits may be aided by means of a pyrometer placed in the catalytic mass and a thermostatic device may be employed to admit more or less steam so that the temperature of the catalytic material may be automatically adjusted and maintained. While the temperature responds very quickly to the effect of increase or decrease in proportion of steam the control may be carried out in other ways as for example by regulation of the temperature of the incoming mixture or by the addition of a greater or lesser amount of air. The thermostatic control of the oxidation likewise forms a phase of the present invention.

For example kerosene oil may be allowed to drip down into a catalytic chamber containing fragments of pumice on which is supported vanadium oxide. Air is at the same time forced into the catalytic chamber. The chamber is surrounded by a lead bath which is heated to 430–450° C. When the oil is first introduced it is desirable to have the bath at a slightly lower temperature as the oxidation of the kerosene heats the bath and in one case an increase in temperature from 407° C. to 432° C. was noted. The exit gases were found to have a temperature of 333° C. maximum. The exit gases contained 5.2 to 6.6% carbon dioxide and 3 to 4.2% of oxygen. Formaldehyde, formic acid and crystalline acids were obtained from the gases by washing with water. At the same time a gasoline substitute was secured.

In the present invention it is an objective to oxidize not merely unsaturated constituents which may be present but also the saturated hydrocarbons. Methane is not easily oxidized selectively but burns completely to carbon dioxide or dioxide and monoxide. On the other hand higher hydrocarbons are less prone to complete combustion no doubt due to the likelihood of combustion taking place in stages. Hence ethane, propane, butane, pentane and the like may be advantageously treated. In a mixture containing for example such saturated hydrocarbons and unsaturated ones such as ethylene, propylene, butylene, amylene etc. it is desirable to carry out the oxidation such that a fairly complete utilization of both the saturated and unsaturated hydrocarbons is secured.

By the use of composite catalyzer such as one consisting of iron and vanadium or iron oxide and vanadium oxide above noted advantageous conditions obtain as both the iron and the vanadium have stages of oxidation which render them desirably effective. In the present invention it is thus preferred to use such duplex catalysts preferably composed of metals or compounds of the metals each of which has more than one stage of oxidation.

In another case kerosene was passed through a cracking tube heated to between 540 and 590° C. approximately. Products from the cracking tube were passed through a trap to remove readily condensable substances and very heavy products, and the vapors and fixed gases were passed to a mixing chamber where they were mingled with air. The latter had previously been bubbled through water in order to have moisture present during the catalytic reaction. The mixture was passed through a porous catalytic mass heated to 425 to 430° C. by means of a bath of molten lead. The latter was stirred by means of an agitator in order to preserve the bath of uniform temperature. The products issuing from the catalyzer were passed through a condenser and then were scrubbed with water to collect organic acids. The vapors were further scrubbed with oil and finally exposed to contact with silica gel. From the several scrubbing operations gasoline substitute, various oils and acids were obtained. One acid was solid crystallizing in needles and melting 109–110° C., it had pronounced reducing properties.

While I have noted illustrations in which a lead bath was used it should be understood that in place of a bath to control the temperature when working on the large scale, regeneration of the heat together with the use of steam or moisture in the entering mixture may serve in place of the fused bath.

While my invention is illustrated by the preferred hydrocarbon kerosene or lamp oil I do not limit myself thereto but may use other petroleum hydrocarbons or the products derived from cracking hydrocarbons including the by-product gases of pressure stills or other stills.

What I claim is:—

1. In the catalytic oxidation of petroleum hydrocarbons the step which comprises passing the reaction mixture over a catalytic mass of high heat conductivity maintained at a black heat approaching a low red heat.

2. In the catalytic oxidation of petroleum hydrocarbons the step which comprises passing the reaction mixture over a catalytic mass of substantially the heat conductivity of metallic masses and maintaining the temperature at a black heat approaching a low red heat.

3. In the catalytic oxidation of petroleum oils the step which comprises passing a mixture of petroleum vapor and air over a composite catalyzer containing two active oxidizing agents, said catalyzer having substantially the heat conductivity of metallic masses.

4. In the catalytic oxidation of petroleum oils the step which comprises passing a mixture of kerosene and air over a catalyzer comprising iron and vanadium material.

5. In the process of catalytic oxidation of petroleum hydrocarbons the step which comprises passing the incoming cool reaction mixture into heat-communicating contact with the catalytic mass whereby an excessive development of localized heat is prevented.

6. In a process of selective oxidation of petroleum hydrocarbons wherein vapors thereof are passed into a catalytic zone in the presence of a gas containing oxygen, at a temperature below a red heat, the step of passing the incoming gas containing oxygen and vapors about the catalytic chamber in such a manner as to cool the latter.

7. In a process of selective oxidation of petroleum hydrocarbons wherein vapors thereof are passed into a reaction zone in the presence of a gas containing oxygen at a temperature below a red heat, the step of introducing steam into the reaction zone, the amount of steam thus admitted being thermostatically regulated according to the temperature of the reaction zone.

8. The method of selective oxidation which comprises passing a hydrocarbon gas-vapor containing propane, butane, and pentane in admixture with air through a heated catalytic conversion zone under conditions to form partial oxidation products.

9. The method of selective oxidation which comprises passing a hydrocarbon gas-vapor containing saturated and unsaturated hydrocarbons, in admixture with air through a heated conversion zone at a temperature below a red heat while cooling the conversion zone.

10. The method of selective oxidation which comprises passing the hydrocarbon gas-vapor containing propane, butane and pentane in admixture with air through a heated catalytic conversion zone at a temperature below a red heat while cooling said conversion zone to maintain the temperature thereof within the range of partial oxidation.

11. The process of treating hydrocarbons which comprises passing a mixture of by-product gases from petroleum stills, with air through a heated conversion zone at a temperature below a red heat to form partial oxidation products.

12. The process of treating hydrocarbons which comprises passing petroleum vapors admixed with air through a conversion zone heated to a temperature within the range of partial oxidation and within a temperature range at which the very heat-sensitive products of oxidation are substantially retained in the materials withdrawn from the conversion zone.

CARLETON ELLIS.

DISCLAIMER 1,697,263.—*Carleton Ellis*, Montclair, N. J. PROCESS OF OXIDIZING KEROSENE. Patent dated January 1, 1929. Disclaimer filed November 25, 1935, by the assignee, *Ellis-Foster Company*.

Hereby enters this disclaimer to that part of the claim in said specification which is in the following words, to wit: Your Petitioner does hereby disclaim from the process of claims 1–3, inclusive, and claim 12, all processes of treating hydrocarbons except those in which there is used a catalyzer comprising a metallic substance.

[*Official Gazette December 31, 1935.*]

6. In a process of selective oxidation of petroleum hydrocarbons wherein vapors thereof are passed into a catalytic zone in the presence of a gas containing oxygen, at a temperature below a red heat, the step of passing the incoming gas containing oxygen and vapors about the catalytic chamber in such a manner as to cool the latter.

7. In a process of selective oxidation of petroleum hydrocarbons wherein vapors thereof are passed into a reaction zone in the presence of a gas containing oxygen at a temperature below a red heat, the step of introducing steam into the reaction zone, the amount of steam thus admitted being thermostatically regulated according to the temperature of the reaction zone.

8. The method of selective oxidation which comprises passing a hydrocarbon gas-vapor containing propane, butane, and pentane in admixture with air through a heated catalytic conversion zone under conditions to form partial oxidation products.

9. The method of selective oxidation which comprises passing a hydrocarbon gas-vapor containing saturated and unsaturated hydrocarbons, in admixture with air through a heated conversion zone at a temperature below a red heat while cooling the conversion zone.

10. The method of selective oxidation which comprises passing the hydrocarbon gas-vapor containing propane, butane and pentane in admixture with air through a heated catalytic conversion zone at a temperature below a red heat while cooling said conversion zone to maintain the temperature thereof within the range of partial oxidation.

11. The process of treating hydrocarbons which comprises passing a mixture of by-product gases from petroleum stills, with air through a heated conversion zone at a temperature below a red heat to form partial oxidation products.

12. The process of treating hydrocarbons which comprises passing petroleum vapors admixed with air through a conversion zone heated to a temperature within the range of partial oxidation and within a temperature range at which the very heat-sensitive products of oxidation are substantially retained in the materials withdrawn from the conversion zone.

CARLETON ELLIS.

DISCLAIMER 1,697,263.—*Carleton Ellis*, Montclair, N. J. PROCESS OF OXIDIZING KEROSENE. Patent dated January 1, 1929. Disclaimer filed November 25, 1935, by the assignee, *Ellis-Foster Company*.

Hereby enters this disclaimer to that part of the claim in said specification which is in the following words, to wit: Your Petitioner does hereby disclaim from the process of claims 1–3, inclusive, and claim 12, all processes of treating hydrocarbons except those in which there is used a catalyzer comprising a metallic substance.

[*Official Gazette December 31, 1935.*]